Feb. 13, 1951     R. J. DETUNO     2,541,576
APPARATUS FOR DETERMINING FLUENT LEVEL
Filed Oct. 6, 1947
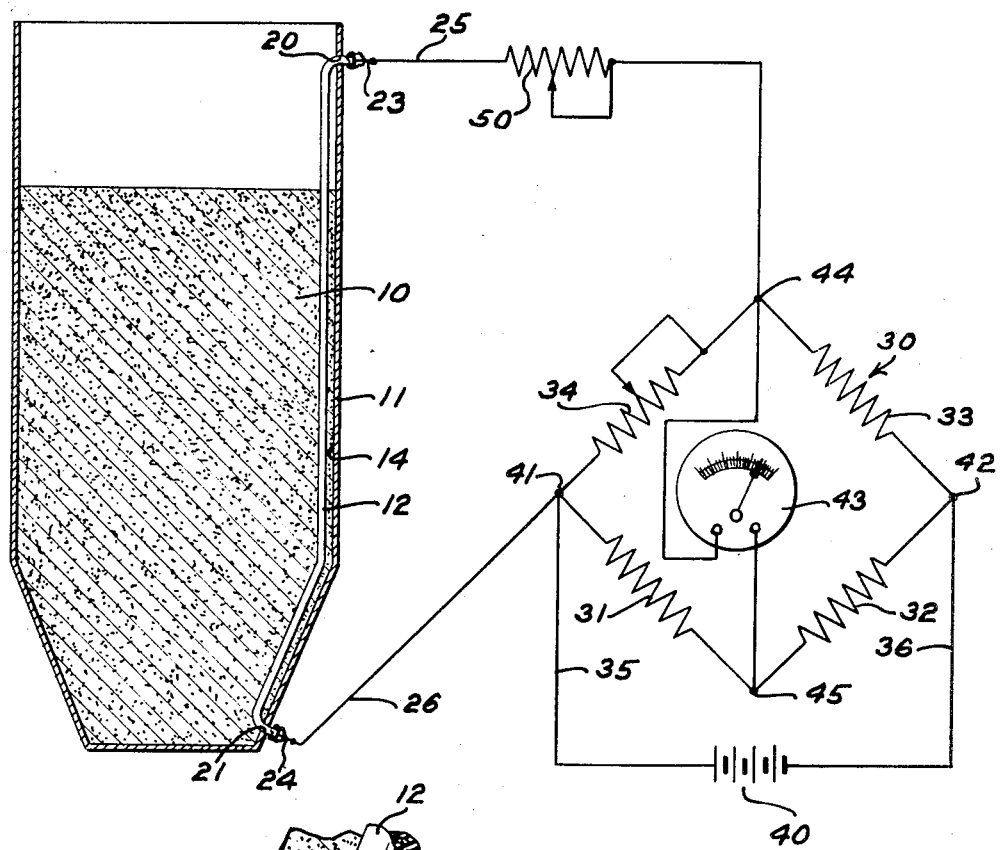
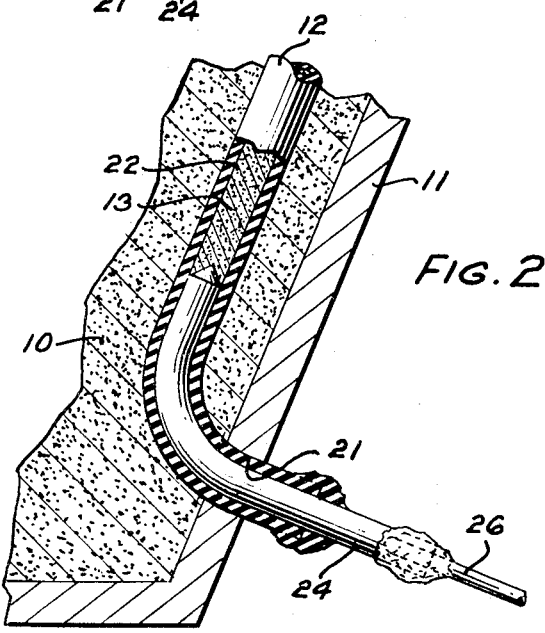
INVENTOR
R. J. DETUNO
BY *E. F. Kane*
ATTORNEY

UNITED STATES PATENT OFFICE 2,541,576

APPARATUS FOR DETERMINING FLUENT LEVEL

Rocco J. Detuno, Kenmore, N. Y., assignor to Western Electric Company, Incorporated, New York, N. Y., a corporation of New York Application October 6, 1947, Serial No. 778,240

5 Claims. (Cl. 73—304)

1

This invention relates to measuring methods and apparatus, and more particularly to a method of and an apparatus for indicating the level of granular material stored in a tank.

Heretofore, there has not been available a simple and effective apparatus for indicating at a distance the level or depth of granular material stored in tanks or containers. Apparatus designed for the measurement of volume of liquids in tanks generally do not operate successfully to measure volume of granular material since granular material does not attain the fluidity of liquids.

It is an object of this invention to provide a new and efficient method of and apparatus for indicating the level or depth of granular material in a tank.

In accordance with one embodiment of this invention such a measuring apparatus comprises a long rubber tube filled with carbon granules and disposed vertically from the top to the bottom of the inside wall of a storage tank. Both ends of the carbon filled rubber tube are provided with electrodes to contact the carbon column and connect it into one of the arms of a bridge circuit having an indicating meter which measures the degree of balance or unbalance of the bridge circuit resulting from changes of the resistance of the carbon column due to variations in the lateral pressure applied to the carbon filled rubber tube as the level of the stored material changes.

A complete understanding of the invention will be had by reference to the following detailed description taken in conjunction with the accompanying drawings, in which Fig. 1 is a diagrammatic representation of the apparatus embodying the features of the invention with the carbon filled rubber tube shown in exaggerated relation to the rest of the storage tank; and Fig. 2 is an enlarged cross-sectional view of the lower end of the carbon filled rubber tube and the electrode therein.

As shown in the drawing, one embodiment of this invention is adapted for measuring the level or depth of granular material 10 stored in a tank 11 in which the volume of the stored material is changed from time to time by replacement or removal of the material in the tank. A flexible tube 12, which may be made of rubber or any other suitable compressible material and having its interior space filled with suitable granular resistive material 13, for example carbon granules, is vertically disposed along an inside surface 14 of the tank wall and extends from the bottom to the top of the tank. The upper and lower ends of the tube 12 may be curved so as to project through apertures 20 and 21 formed in the wall of the tank especially for that purpose.

Electrical contact with the carbon column 22 formed by the carbon granules 13 is provided by electrodes 23 and 24 inserted into the upper and lower ends, respectively, of the tube 12. A suitable seal may be provided between the electrodes and the ends of the tube with a suitable sealing compound, for example, paraffin or a rubber compound. Electrical wires 25 and 26 may be connected to the electrodes 23 and 24, respectively, by any suitable method, for example, soldering.

Since the invention herein operates by indicating the changes in the resistivity of the carbon column 22 contained in the tube 12 due to the variations in lateral pressure applied through the rubber tube 12 to the carbon column because of changes in the level or depth of the granular material 10 in the tank 11, a bridge circuit 30 of suitable sensitivity is provided to measure and indicate the resistive changes in the carbon column.

The bridge 30 comprises resistance elements 31, 32, 33 and an adjustable resistance 34 connected in the form of an electrical bridge which may be energized through the leads 35 and 36 connected to a suitable source of electrical power 40, for example, a battery, the leads also being connected to the bridge points 41 and 42. A current actuated meter 43 is connected across the bridge at points 44 and 45 to indicate the electrical balance or degree of unbalance of the bridge. The electrode 23 at the upper end of the carbon column 22 is connected to the point 44 in the bridge through a resistor 50 which may be adjusted to compensate for different lengths of resistance columns that might be used. The electrode 24 at the lower end of the resistance column is connected to the point 41 of the bridge. The carbon resistance column between the electrodes 23 and 24 together with the resistor 50 forms a resistive shunt across the variable resistor 34. Any variation in resistance in the carbon column will change the distribution of current in the branches of the bridge 30 which will be indicated by changes in the reading of the meter 43 from any given reference point.

It will be apparent that as the level of the powdered material 10 changes, the lateral pressure on the carbon column 22 through the compressible walls of the rubber tube 12 will be changed thereby changing the total ohmic resistance of the carbon column 22 between the electrodes 23 and 24. These changes in ohmic resistance will affect the current distribution in the bridge and will be indicated on the meter 43 which may be calibrated in terms of volume or in lineal measure indicating the height of the powdered material 10 in the tank 11. The total ohmic resistance of the carbon column will vary proportionally with the level of the powdered material 10. It is well known that when a confined mass of carbon granules is compacted by pressure the resistance of the mass decreases and when the pressure is released the resistance of the mass increases. When the level of the powdered material 10 is at its lowest point in the tank 11 the ohmic resistance of the resistance column in the rubber tube 12 will be at its greatest. At this point the bridge meter 43 may be indexed at zero. When the powdered material 10 is poured in the tank 11 the flow of material into the tank may be interrupted at predetermined levels and the meter 43 may be calibrated to indicate the level of the material at such points.

The apparatus is simple and inexpensive in construction and the indicating meter 43 may be located at a remote control board to facilitate the determination of the material level in the tank 11.

What is claimed is:

1. An apparatus for indicating the level of granular solids in a storage container, said apparatus comprising an electrically non-conducting tube having compressible walls disposed substantially vertically within the storage space of said container, a resistance column formed by a mass of granular electrically conducting resistive material disposed within the hollow portion of said tube, and means connected to said resistance column for indicating changes in the ohmic resistance of said resistance column due to variations of lateral pressure that may be applied by the weight of the storage material at a plurality of points along the length of said tube.

2. An apparatus for indicating the level of granular material in a container, said apparatus comprising a resistance column responsive to lateral pressure to change its ohmic resistance comprising an electrically non-conducting tube having compressible walls and containing electrically conducting granular resistive material and having electrodes at each end of said tube to contact the granular resistive material, said tube being disposed substantially vertically within said container, and means for measuring the changes in ohmic resistance of said resistance column due to variations in the lateral pressure applied to said column by changes in the level of the granular material stored in said container.

3. An apparatus for measuring the level of stored granular material in a container, said apparatus comprising a rubber tube having compressible side walls disposed substantially vertically within the storage space of said container, a mass of granular electrically conducting resistive material disposed within the hollow portion of said tube, electrodes at the ends of said tube for making contact with the granular resistive material therein, and an electrical resistance bridge connected to said electrodes for measuring changes in the total resistivity of said mass of granular resistive material caused by changes in the pressure exerted by the material in the container as an indication of the level of the stored material in said container with respect to a predetermined reference point.

4. An apparatus for indicating the level of granular material in a storage container comprising a flexible electrically non-conducting tube extending upright within said container and having a longitudinally extending bore of uniform cross-sectional area, electrically conducting particles in the bore of said tube forming an electrical resistance column, the particles of said resistance column being compressible into more intimate contact progressively along its length by the side walls of said tube in response to pressure exerted laterally on said tube by the material in said container to vary the electrical resistance of said resistance column, and means including means connected to the ends of said resistance column for measuring the electrical resistance of said resistance column to indicate the height of the material within said container.

5. An apparatus for indicating the level of granular material in a storage container comprising a flexible rubber tube extending upright within said container and having a longitudinally extending bore of uniform cross-sectional area, carbon particles in the bore of said tube forming an electrical resistance column, the carbon particles of said resistance column being compressible into more intimate contact progressively along its length by the walls of said tube in response to pressure exerted laterally on said tube by the material in said container to vary the electrical resistance of said resistance column, electrodes at each end of said tube in contact with the ends of said resistance column, and means for indicating the level of said granular material including means connected to said electrodes for measuring the resistance of said resistance column.

ROCCO J. DETUNO.

REFERENCES CITED

The following references are of record in the file of this patent:

UNITED STATES PATENTS

| Number | Name | Date |
|---|---|---|
| 787,089 | Fahrney | Apr. 11, 1905 |
| 2,042,606 | Kotowski | June 2, 1936 |
| 2,044,080 | Kemper | June 16, 1936 |

FOREIGN PATENTS

| Number | Country | Date |
|---|---|---|
| 243,143 | Great Britain | Nov. 26, 1925 |
| 752,158 | France | Sept. 18, 1933 |